United States Patent [19]

Vasudevan

[11] 4,452,835

[45] Jun. 5, 1984

[54] MULTILAYER FILM FOR PRIMAL MEAT PACKAGING

[75] Inventor: Ganapathy Vasudevan, E. Windsor, N.J.

[73] Assignee: Union Carbide Corporation, Danbury, Conn.

[21] Appl. No.: 422,079

[22] Filed: Sep. 23, 1982

[51] Int. Cl.³ .............. B32B 27/08; A21D 10/02; B29D 5/04

[52] U.S. Cl. .................... 428/35; 426/127; 426/129; 428/216; 428/516; 428/520; 383/113; 264/510

[58] Field of Search ............ 428/516, 520, 216, 35; 426/127, 129; 229/87 F; 383/109, 113, 117; 264/510

[56] References Cited

U.S. PATENT DOCUMENTS

| | | | |
|---|---|---|---|
| 3,453,173 | 7/1969 | Isley et al. | 161/190 |
| 3,959,568 | 5/1976 | Hill et al. | 428/462 |
| 4,109,037 | 8/1978 | Nohara | 428/35 |
| 4,139,665 | 2/1979 | Herrero | 428/35 |
| 4,230,761 | 10/1980 | Watts | 428/215 |
| 4,357,376 | 11/1982 | Nattinger et al. | 428/516 |
| 4,359,506 | 11/1982 | Wiggins et al. | 428/520 |
| 4,386,138 | 5/1983 | Arbit | 428/520 |

*Primary Examiner*—William R. Dixon, Jr.
*Attorney, Agent, or Firm*—John C. Lefever; Real J. Grandmaison

[57] ABSTRACT

A multilayer film suitable for packaging a primal red meat cut comprising at least a first layer of a mixture of low molecular weight thermoplastic hydrocarbon resin and a polymeric resin selected from the group consisting of polyolefins and ethylene-vinyl acetate copolymers, and a second layer comprising acrylonitrile. The hydrocarbon resin serves as an adhesion promoter between the first layer and the second layer, and is selected from the group consisting of alpha-methyl-styrene copolymerized with styrene which may be 30 to 60 percent hydrogenated, and ethylene-vinyl acetate copolymers containing 8 to 30 percent by weight of vinyl acetate. A process for producing the multilayer films by coextrusion is also disclosed.

22 Claims, No Drawings

MULTILAYER FILM FOR PRIMAL MEAT PACKAGING

This invention relates to a multilayer film having gas and moisture barrier properties suitable for use in the packaging of a primal meat cut, and to a bag fabricated from the multilayer film.

Generally, a primal meat cut is a large cut of meat smaller than a side of beef but larger than a typical retail cut sold to a consumer. A primal meat cut is prepared at the slaughter house and then shipped to a retail store or institution such as a restaurant at which the primal meat cut is butchered into smaller cuts of meat.

It is the customary practice to package a primal meat cut for shipment so that oxygen from the air is prevented from contacting the meat. This minimizes spoilage and discoloration of the meat.

It is known from the prior art for packaging meat cuts to use a film including a layer serving as an oxygen barrier to protect the meat from spoilage, such as a layer of polyvinylidene chloride copolymer. The other layers generally provide strength, abrasion resistance, and good low temperature properties.

Other important properties of suitable multilayer films include puncture resistance, water vapor barrier properties, and resistance to delamination.

Further, the film suitable for packaging primal meat cuts should be capable of being heat sealable so that a bag can be fabricated from the film and heat sealed seams should resist being pulled apart.

In addition to having desirable chemical and physical properties, the multilayer film must also be economical to manufacture and be suitable for commercial production.

Polymeric packaging materials are well known in the art. The most notable of these are polyethylene, polypropylene, and polyvinylidene chloride copolymers having good moisture barrier properties. In recent years polymeric materials prepared from a major amount of nitrile monomers such as acrylonitrile and methacrylonitrile have significantly advanced the state of the packaging art. These high nitrile packaging materials have been found to exhibit superior barrier properties to oxygen but not to water vapor. Consequently, these materials have achieved special significance in the packaging of food, beverages, medicines and other related substances which are adversely affected by even small amounts of oxygen. It has also been found that a laminate of nitrile films and polyolefin films offers many other desirable properties which neither of these films possess individually. However, due to the chemical and polarity differences of the nitrile resins with most polymers, an adhesive layer is required to provide bonding strength between films of such polymers.

In the packaging industry, such laminates are generally fabricated by using an adhesive layer between the nitrile layer and the polyolefin layer where the adhesives employed are aqueous or solvent-based. Adhesive is applied to one layer which is then either combined with another ply before or after drying the adhesive, and then bonding them together with heat and pressure. These processes are, however, capital intensive and are less economical than the well known coextrusion process. Also, these processes, unlike the coextrusion process, can not be used to produce a seamless multilayer tubing.

In the coextrusion process, solvent or water-based adhesives cannot be used. The adhesive layer must be extrudable with nitrile and other polymers. Further, the viscosity of the adhesive layer must be about the same as the viscosities of the other resin layers coextruded to avoid channeling in the die, that is, the displacement of one material by another at the point where they join together in the die. A desirable method of providing a laminate or multilayer film of a nitrile-rich resin and a polyolefin resin would be a coextrusion process wherein the produced film laminate comprises film layers which are strongly bonded to each other without the use of an adhesive layer.

Accordingly, there is a continuing need for providing multilayer films which overcome the noted deficiencies in the prior art multilayer films.

In accordance with the present invention there is provided a method of preparing a multilayer film comprising coextruding a film layer comprising a mixture of a low molecular weight thermoplastic hydrocarbon resin and a polyolefin as a first or inside layer, and a film layer comprising acrylonitrile as a second or outside layer. The multilayer film may be coextruded through a multilayer die or a flat die, and the two film layers can be combined inside the die or outside the die.

In another embodiment of this invention there is provided a method of preparing a multilayer film comprising coextruding a film layer comprising a mixture of a low molecular weight thermoplastic hydrocarbon resin and an ethylene-vinyl acetate copolymer as a first or inside layer, and a film layer comprising acrylonitrile as a second or outside layer. Where the multilayer film of this invention is a two-layer film, the layer comprising acrylonitrile is the outside layer.

In a further embodiment of this invention there is provided a method of preparing a multilayer film comprising coextruding a first outer layer comprising a mixture of a low molecular weight thermoplastic hydrocarbon resin and a polymeric resin selected from the group consisting of polyolefins and ethylene-vinyl acetate copolymers, a core layer comprising acrylonitrile, and a second outer or inside layer comprising a mixture of a low molecular weight thermoplastic hydrocarbon resin and a polymeric resin selected from the group consisting of polyolefins and ethylene-vinyl acetate copolymers. Thus, in this embodiment, the first outer layer and the second outer, i.e., the inner, layer may contain a polyolefin or an ethylene-vinyl acetate copolymer or a mixture thereof in either or both outer layers.

In accordance with this invention, the multilayer film may comprise a first outer layer, i.e., outside layer, composition comprising a low molecular weight thermoplastic hydrocarbon resin selected from the group consisting of a low molecular weight alpha methyl styrene-styrene copolymer, a 30 to 35 percent by weight hydrogenated low molecular weight alpha methyl styrene-styrene copolymer, and a 60 percent by weight hydrogenated low molecular weight alpha methyl styrene-styrene copolymer mixed with a polymeric resin selected from the group consisting of polyolefins and ethylene-vinyl acetate copolymers having a vinyl acetate content of between about 8 and about 30 percent by weight based on the ethylene-vinyl acetate copolymers. The core layer of the multilayer film composition comprises an acrylonitrile, preferably, an acrylonitrile copolymer such as a nitrile rubber-modified acrylonitrile methyl acrylate copolymer containing 73–77 parts by weight of acrylonitrile, and 27–23 parts by weight of methyl acrylate produced by graft copolymerization in the presence of 8–10 parts by weight of a butadiene-acrylonitrile copolymer containing about 70% by weight of polymer units derived from butadiene. When a second outer layer, i.e., inside layer, is present in the multilayer film composition of this invention, the second outer layer may comprise an ethylene-vinyl acetate copolymer having a vinyl acetate content of between about 8 and about 15 percent by weight based on the ethylene-vinyl acetate copolymer. In addition, the second outer layer may contain a low molecular weight thermoplastic hydrocarbon resin selected from the group consisting of a low molecular weight alpha methylstyrene-styrene copolymer, a 30 to 35 percent by weight hydrogenated low molecular weight alpha methylstyrene-styrene copolymer and a 60 percent by weight hydrogenated low molecular weight alpha methylstyrene-styrene copolymer mixed with a polymeric resin selected from the group consisting of polyolefins and ethylene vinyl acetate copolymers having a vinyl acetate content of between about 8 and about 30 percent by weight based on the ethylene-vinyl acetate copolymers. The polymeric resin present in the first outer layer and second outer layer may be an ethylene-vinyl acetate copolymer having a vinyl acetate content of between about 8 and about 15 percent by weight based on the ethylene-vinyl acetate copolymer, or a mixture of said ethylene-vinyl acetate copolymer and an ethylene-vinyl acetate copolymer having a vinyl acetate content of between about 15 and about 30 percent by weight based on the ethylene-vinyl acetate copolymer. Further, the polymer resin present in the first outer layer and second outer layer may be a polyolefin or a mixture of a polyolefin and an ethylene-vinyl acetate copolymer having a vinyl acetate content of between about 15 and about 30 percent by weight based on the ethylene-vinyl acetate copolymer.

The acrylonitrile copolymers employed in the present invention contain a high nitrile content monomer such as acrylonitrile, methacrylonitrile and ethacrylonitrile copolymerized with a comonomer selected from at least one of styrene, vinylidene chloride, butadiene, alkyl acrylates and alkyl methacrylates wherein the alkyl group contains from 2 to 10 carbon atoms. Furthermore, the nitrile portion of the monomer may be about 55 to about 95 weight percent thereof. Preferably, the acrylonitrile copolymer contains a monomer having a high nitrile content copolymerized with an alkyl acrylate monomer or alkyl methacrylate monomer containing 2 to 10 carbon atoms in the alkyl group. Optimum results have been obtained when the acrylonitrile copolymer is produced by graft copolymerization of between about 73 and about 77 parts by weight of acrylonitrile and about 23 to about 27 parts by weight of methyl acrylate in the presence of between about 8 and about 10 parts by weight of a butadiene-acrylonitrile copolymer containing about 70 percent by weight of polymer units derived from butadiene.

The polyolefins useful in the present invention are preferably the solid, resinous polymers of alpha-monoolefins such as including polyethylene, polypropylene, the polybutenes, the polypentenes, and the like including polymers of at least one alpha-olefin having the structure:

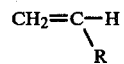

wherein R can be hydrogen or an alkyl group having from 1 to 6 carbon atoms. Most preferred in the present invention are homopolymers and copolymers of ethylene and propylene. The polyolefins useful herein also may be atactic, isotactic, syndiotactic, crystalline or amorphous or any combination of these structures.

The ethylene-vinyl acetate copolymers useful in the present invention are those containing from between about 8 and about 30 percent by weight of vinyl acetate units. Further, the ethylene-vinyl acetate copolymers may have a melt index of between about 0.2 and about 2.0 decigrams per minute.

The low molecular weight thermoplastic hydrocarbon resin employed as a component in the mixture for the first outer layer or second outer layer has been found to promote adhesion between said layer or layers and the substrate or core layer of acrylonitrile polymer without the need for a separate adhesive layer to maintain adhesion therebetween. The hydrocarbon resin may be dry-blended with the polyolefin or ethylene-vinyl acetate copolymer component of the first outer layer or second outer layer, melted, and coextruded with the first or second outer layer. Generally speaking, the hydrocarbon resins in dry form are irregular flakes and have a low softening temperature and thus may not feed uniformly in the extruder hopper with solid pellets such as polyethylene. However, such may be overcome by preparing a concentrate of the hydrocarbon resin in the polyolefin or ethylene-vinyl acetate copolymer by using a melt-mixer.

The low molecular weight thermoplastic hydrocarbon resin adhesion promoters useful in this invention comprise alpha-methylstyrene copolymerized with styrene; 30 to 60 percent hydrogenated alpha-methylstyrene-styrene copolymers; and ethylene-vinyl acetate copolymers containing a high percentage of vinyl acetate, i.e., on the order of between about 8 and about 30 percent by weight of vinyl acetate based on the weight of the ethylene-vinyl acetate copolymer. These low molecular weight thermoplastic hydrocarbon adhesion promoters provide satisfactory results when mixed with the polyolefin or ethylene-vinyl acetate component forming the first layer or the outer layers of the multilayer films in an amount of from between about 3 percent and about 12 percent by weight based on the weight of the polyolefin or ethylene-vinyl acetate component. However, it is preferred that the low molecular weight thermoplastic hydrocarbon adhesion promoters be present in an amount of between about 5 percent and about 10 percent by weight based on the weight of the polyolefin or ethylene-vinyl acetate copolymer component. Lesser amounts do not provide adequate adhesion to the nitrile resin layer. On the other hand, amounts in excess of about 10% by weight based on the weight of the polyolefin or ethylene-vinyl acetate copolymer will produce a polyolefin or ethylene-vinyl acetate resin layer that may be too tacky to handle during subsequent operations.

The multilayer films of the present invention are prepared by coextrusion of the first layer and the second layer or by coextrusion of the first outer layer, the core layer, and the second outer layer using multiple extruders to melt and pump the resin materials through a multilayer die. The melt extrudate is blown into a tubular film or may be prepared in sheet form depending on the shape of the die employed. However, it is preferred that the melt extrudate be blown into a tubular film to obtain a seamless biaxially stretched film.

strength is determined for each sample. The average value for three samples is reported as the peel strength in pounds per inch. Table I summarizes the inter-layer bond strength between the core layer and the outer layers containing various adhesion promoters.

TABLE I

| Sample Number | First Outer Layer (outside layer) | Core Layer | Second Outer Layer (inside layer) | Bond Strength between outside layer & core layer (lb./in.) |
|---|---|---|---|---|
| 1 | Alathon 3135-100% | Barex 210-100% | Alathon 3135-100% | 0.03 |
| 2 | Alathon 3135-90% Kristalex 3100-10% | Barex 210-100% | Alathon 3135-100% | 0.8 |
| 3 | Alathon 3135-80% Kristalex 3100-10% EVA-508-10% | Barex 210-100% | Alathon 3135-100% | 1.6 |
| 4 | Alathon 3135-80% Kristalex 3100-5% EVA-508-15% | Barex 210-100% | Alathon 3135-100% | 0.8 |
| 5 | Alathon 3135-60% XPS-313-10% EVA-508-20% Slip Concentrate-10% | Barex 210-100% | Alathon 3135-60% XPS-313-10% EVA-508-20% Slip Concentrate-10% | 0.4 |
| 6 | Alathon 3135-60% Kristalex 3100-10% EVA-508-20% Slip Concentrate-10% | Barex 210-100% | Alathon 3135-60% Kristalex 3100-10% EVA-508-20% Slip Concentrate-10% | 0.8 |
| 7 | Barex 210-100% | Alathon 3135-75% EVA-508-18.75% XPS-541-6.25% | Alathon 3135-100% | 0.03 |
| 8 | DXM-130-90% Kristalex 3100-10% | Barex 210-100% | Alathon 3135-100% | 1.2 |
| 9 | DXM-130-80% XPS-313-5% EVA-508-15% | Barex 210-100% | DXM-130-80% XPS-313-5% EVA-508-15% | 0.05 |

The multilayer films of the instant invention may be of any suitable thickness. When the multilayer films comprise two layers it is preferred that the first layer have a thickness of between about 1.0 mil and about 2.0 mils, and that the second layer have a thickness of between about 0.4 mil and about 0.8 mil. When the multilayer films comprise three layers, it is preferred that the first outer layer have a thickness of between about 0.6 mil and about 1.2 mils, the core layer have a thickness of between about 0.3 mil and about 0.8 mil, and the second outer layer have a thickness of between about 0.6 mil and about 1.2 mils.

Illustrative, non-limiting examples of the features and practice of the invention are set out below. The parts and percentages set forth herein refer to parts by weight and percentages by weight, respectively, unless specifically stated otherwise.

In accordance with this invention, the following procedure was employed to evaluate the degree of controlled separation or adhesion between the layers of the instant multilayer films. Test samples were randomly selected across the entire circumference of the film tubing prepared. The samples were one inch wide and about six inches in length. Peeling apart was initiated in each sample sufficiently so that the acrylonitrile layer could be held in the fixed jaw of an Instron tensile tester, Model TM, made by Instron Engineering Corporation, and the outer layer was held by the moving jaw. The cross head speed and the chart speed were set at one inch per minute. The upper stationary clamp was connected to a load sensing cell. The force exerted for peeling the outer layer from the acrylonitrile layer is recorded on the moving chart which provides a record of the bond strength between the layers along the sample. The test is conducted until at least four inches of the sample is peeled apart. Using the chart, the average peel In Table 1 above, Alathon 3135 comprises ethylene-vinyl acetate containing 12% by weight of vinyl acetate available from E. I. DuPont Co. DXM-130 comprises low density polyethylene produced by Union Carbide Corporation. EVA-508 comprises ethylene-vinyl acetate containing 28% by weight of vinyl acetate available from Union Carbide Corporation. Kristalex 3100 comprises low molecular weight alpha methyl styrene-styrene copolymer available from Hercules Powder Co. XPS-313 comprises 30 to 35 percent by weight hydrogenated low molecular weight alpha methyl styrene-styrene copolymer. XPS-541 comprises 60 percent by weight hydrogenated low molecular weight alpha methyl styrene-styrene copolymer. XPS-313 and XPS-541 are both available from Hercules Powder Co. Barex 210 comprises a nitrile rubber-modified acrylonitrile methyl acrylate copolymer containing 73-77 parts by weight of acrylonitrile, 27-23 parts by weight of methyl acrylate produced by graft copolymerization in the presence of 8-10 parts by weight of a butadiene-acrylonitrile copolymer containing about 70% by weight of polymer units derived from butadiene available from Vistron Corp. The slip concentrate was a melt mixture concentrate of 91.0% ethylene-vinyl acetate having a vinyl acetate content of about 15% by weight and a melt index of about 0.5 decigram per minute, 4.5% of diatomaceous silica, 2.25% of a stearamide and 2.25% of an erucamide.

It can be seen from the results obtained in Table I that the addition of about 5% to about 10% of the adhesion promoters comprising a low molecular weight alpha methyl styrene-styrene copolymer markedly improved the adhesion between the outside layer and a core layer comprising acrylonitrile. It can also be seen that the addition of an ethylene-vinyl acetate copolymer containing about 28% by weight of vinyl acetate to an outside layer of polyethylene or ethylene-vinyl acetate copolymer containing about 12% by weight of vinyl acetate also improved the adhesion between the outside layer and a core layer comprising acrylonitrile. Likewise, as the amount of these adhesion promoters present in the outside layer increases so does the bond strength with the core layer. However, the presence of slip additive adversely affects the bond strength of these multilayer films.

Although preferred embodiments of this invention have been described in detail, it is contemplated that modifications thereof may be made and some preferred features may be employed without others, within the spirit and scope of the broad invention.

I claim:

1. A multilayer film suitable for packaging a primal red meat cut having a first outer layer comprising a mixture containing between about 3 percent and about 12 percent by weight, based on the weight of said mixture, of low molecular weight thermoplastic hydrocarbon resin selected from the group consisting of alpha-methylstyrene copolymerized with styrene, 30 to 60 percent hydrogenated alpha-methylstyrene-styrene copolymers, and ethylene-vinyl acetate copolymers containing between about 8 and about 30 percent by weight of vinyl acetate based on the weight of said ethylene-vinyl acetate copolymer, the balance of said mixture comprising a polymeric resin selected from the group consisting of polyolefins, ethylene-vinyl acetate copolymers, and mixtures thereof; a core layer comprising an acrylonitrile copolymer; and a second outer layer comprising a polymeric resin selected from the group consisting of polyolefins, ethylene-vinyl acetate copolymers, and mixtures thereof; wherein said first outer layer has a thickness of between about 0.6 mil and about 1.2 mils, said core layer has a thickness of between about 0.3 mil and about 0.8 mil, said second outer layer has thickness of between about 0.6 mil and about 1.2 mils.

2. A multilayer film in accordance with claim 1 wherein said second outer layer includes a low molecular weight thermoplastic hydrocarbon resin.

3. A multilayer film in accordance with claim 1 wherein said core layer comprises a monomer selected from the group consisting of acrylonitrile, methacrylonitrile and ethacrylonitrile, copolymerized with at least one comonomer selected from the group consisting of styrene, vinylidene chloride, butadiene, alkyl acrylates and alkyl methacrylates wherein the alkyl group contains from 2 to 10 carbon atoms.

4. A multilayer film in accordance with claim 1 wherein the nitrile portion of said acrylonitrile copolymer is from about 55 to about 95 percent by weight based on the weight of said acrylonitrile.

5. A multilayer film in accordance with claim 1 wherein said acrylonitrile copolymer is the graft copolymerization product of between about 73 and about 77 parts by weight of acrylonitrile and about 23 to about 27 parts by weight of methyl acrylate in the presence of between about 8 and about 10 parts by weight of a butadiene-acrylonitrile copolymer containing about 70 percent by weight of polymer units derived from butadiene.

6. A multilayer film in accordance with claim 1 wherein said polyolefins are selected from the group consisting of polyethylene, polypropylene, polybutenes and polypentenes.

7. A primal meat bag formed from the multilayer film of claim 1 or claim 2.

8. A process of producing a multilayer film suitable for packaging a primal red meat cut comprising coextruding a first outer layer comprising a mixture containing between about 3 percent and about 12 percent by weight, based on the weight of said mixture, of low molecular weight thermoplastic hydrocarbon resin selected from the group consisting of alpha-methylstyrene copolymerized with styrene, 30 to 60 percent hydrogenated alpha-methylstyrene-styrene copolymers, and ethylene-vinyl acetate copolymers containing between about 8 and about 30 percent by weight of vinyl acetate based on the weight of said ethylene-vinyl acetate copolymer, the balance of said mixture comprising a polymeric resin selected from the group consisting of polyolefins, ethylene-vinyl acetate copolymers, and mixtures thereof; a core layer comprising an acrylonitrile copolymer; and a second outer layer comprising a polymeric resin selected from the group consisting of polyolefins, ethylene-vinyl acetate copolymers, and mixtures thereof; said first outer having a thickness of between about 0.6 mil and about 1.2 mils, said core layer having a thickness of between about 0.3 mil and about 0.8 mil, and said second outer layer having a thickness of between about 0.6 mil and about 1.2 mils.

9. A process in accordance with claim 8 wherein said second outer layer includes said low molecular weight thermoplastic hydrocarbon resin.

10. A process of producing a multilayer film suitable for packaging a primal red meat cut comprising coextruding a first layer comprising a mixture containing between about 3 percent and about 12 percent by weight, based on the weight of said mixture, of low molecular weight thermoplastic hydrocarbon resin selected from the group consisting of alpha-methylstyrene copolymerized with styrene, 30 to 60 percent hydrogenated alpha-methylstyrene-styrene copolymers, and ethylene-vinyl acetate copolymers containing between about 8 and about 30 percent by weight of vinyl acetate based on the weight of said ethylene-vinyl acetate copolymer, the balance of said mixture comprising a polyolefin; and a second layer comprising an acrylonitrile copolymer; said first layer having a thickness of between about 1.0 mil and about 2.0 mils, and said second layer having a thickness of between about 0.4 mil and about 0.8 mil.

11. A process of producing a multilayer film suitable for packaging a primal red meat cut comprising coextruding a first layer comprising a mixture containing between about 3 percent and about 12 percent by weight, based on the weight of said mixture, of low molecular weight thermoplastic hydrocarbon resin selected from the group consisting of alpha-methylstyrene copolymerized with styrene, 30 to 60 percent hydrogenated alpha-methylstyrene-styrene copolymers, and ethylene-vinyl acetate copolymers containing between about 8 and about 30 percent by weight of vinyl acetate based on the weight of said ethylene-vinyl acetate copolymer, the balance of said mixture comprising an ethylene-vinyl acetate copolymer; and a second layer comprising an acrylonitrile copolymer; said first layer having a thickness of between about 1.0 mil and about 2.0 mils, and said second layer having a thickness of between about 0.4 mil and about 0.8 mil.

12. A multilayer film suitable for packaging a primal red meat cut having a first layer comprising a mixture containing between about 3 percent and about 12 percent by weight, based on the weight of said mixture, of low molecular weight thermoplastic hydrocarbon resin selected from the group consisting of alpha-methylstyrene copolymerized with styrene, 30 to 60 percent hydrogenated alpha-methylstyrene-styrene copolymers, and ethylene-vinyl acetate copolymers containing between about 8 and about 30 percent by weight of vinyl acetate based on the weight of said ethylene-vinyl acetate copolymer, the balance of said mixture comprising a polyolefin; and a second layer comprising an acrylonitrile copolymer; wherein said first layer has a thickness of between about 1.0 mil and about 2.0 mils, and said second layer has a thickness of between about 0.4 mil and about 0.8 mil.

13. A multilayer film in accordance with claim 12 wherein said second layer comprises a monomer selected from the group consisting of acrylonitrile, methacrylonitrile and ethacrylonitrile, copolymerized with at least one comonomer selected from the group consisting of styrene, vinylidene chloride, butadiene, alkyl acrylates and alkyl methacrylates wherein the alkyl group contains from 2 to 10 carbon atoms.

14. A multilayer film in accordance with claim 12 wherein the nitrile portion of said acrylonitrile is from about 55 to about 95 percent by weight based on the weight of said acrylonitrile.

15. A multilayer film in accordance with claim 12 wherein said acrylonitrile copolymer is the graft copolymerization product of between about 73 and about 77 parts by weight of acrylonitrile and about 23 to about 27 parts by weight of methyl acrylate in the presence of between about 8 and about 10 parts by weight of a butadiene-acrylonitrile copolymer containing about 70 percent by weight of polymer units derived from butadiene.

16. A multilayer film in accordance with claim 12 wherein said polyolefin is selected from the group consisting of polyethylene, polypropylene, polybutenes and polypentenes.

17. A primal meat bag formed from the multilayer film of claim 12.

18. A multilayer film suitable for packaging a primal red meat cut having a first layer comprising a mixture containing between about 3 percent and about 12 percent by weight, based on the weight of said mixture, of low molecular weight thermoplastic hydrocarbon resin selected from the group consisting of alpha-methylstyrene copolymerized with styrene, 30 to 60 percent hydrogenated alpha-methylstyrene-styrene copolymers, and ethylene-vinyl acetate copolymers containing between about 8 and about 30 percent by weight of vinyl acetate based on the weight of said ethylene-vinyl acetate copolymer, the balance of said mixture comprising an ethylene-vinyl acetate copolymer; and a second layer comprising an acrylonitrile copolymer; wherein said first layer has a thickness of between about 1.0 mil and about 2.0 mils, and said second layer has a thickness of between about 0.4 mil and about 0.8 mil.

19. A multilayer film in accordance with claim 18 wherein said second layer comprises a monomer selected from the group consisting of acrylonitrile, methacrylonitrile and ethacrylonitrile copolymerized with at least one comonomer selected from the group consisting of styrene, vinylidene chloride, butadiene, alkyl acrylates and alkyl methacrylates wherein the alkyl group contains from 2 to 10 carbon atoms.

20. A multilayer film in accordance with claim 18 wherein the nitrile portion of said acrylonitrile is from about 55 to 95 percent by weight based on the weight of said acrylonitrile.

21. A multilayer film in accordance with claim 18 wherein said acrylonitrile copolymer is the graft copolymerization product of between about 73 and about 77 parts by weight of acrylonitrile and about 23 to about 27 parts by weight of methyl acrylate in the presence of between about 8 and about 10 parts by weight of a butadiene-acrylonitrile copolymer containing about 70 percent by weight of polymer units derived from butadiene.

22. A primal meat bag formed from the multilayer film of claim 18.

* * * * *